United States Patent [19]
Grenier et al.

[11] 3,858,453
[45] Jan. 7, 1975

[54] DRIVING AND STEERING UNIT

[76] Inventors: Joseph Henri Grenier, 220 Grande-Allee E., Quebec; Joseph Emilien Grenier, Newport, Quebec, both of Canada

[22] Filed: Sept. 27, 1973

[21] Appl. No.: 401,264

[52] U.S. Cl. .............. 74/202, 74/665 F, 74/665 GB
[51] Int. Cl. ...................... F16h 17/00, F16h 37/06
[58] Field of Search ............ 74/202, 29, 423, 89.12, 74/206, 665 F, 665 G, 665 GB, 665 M, 417

[56] References Cited
UNITED STATES PATENTS

| | | | |
|---|---|---|---|
| 583,825 | 6/1897 | Squire | 74/202 |
| 662,077 | 11/1900 | Lay | 74/202 |
| 671,495 | 4/1901 | Scott | 74/29 |
| 912,131 | 2/1909 | Jenkins | 74/202 |
| 918,934 | 4/1909 | Voss | 74/89.12 |
| 1,170,877 | 2/1916 | Colwell et al. | 74/202 |

FOREIGN PATENTS OR APPLICATIONS 528,357   8/1921   France .............................. 74/202

*Primary Examiner*—Samuel Scott
*Assistant Examiner*—Allan R. Burke
*Attorney, Agent, or Firm*—Bacon & Thomas

[57] ABSTRACT

The invention is a driving and steering unit with a power driven four to cone transmission which permits to turning the wheels on opposite sides of a vehicle in the same or opposite directions, and an actuating device which allows selection of forward or reverse by shifting and to steer by turning a handlebar in the desired direction.

4 Claims, 9 Drawing Figures

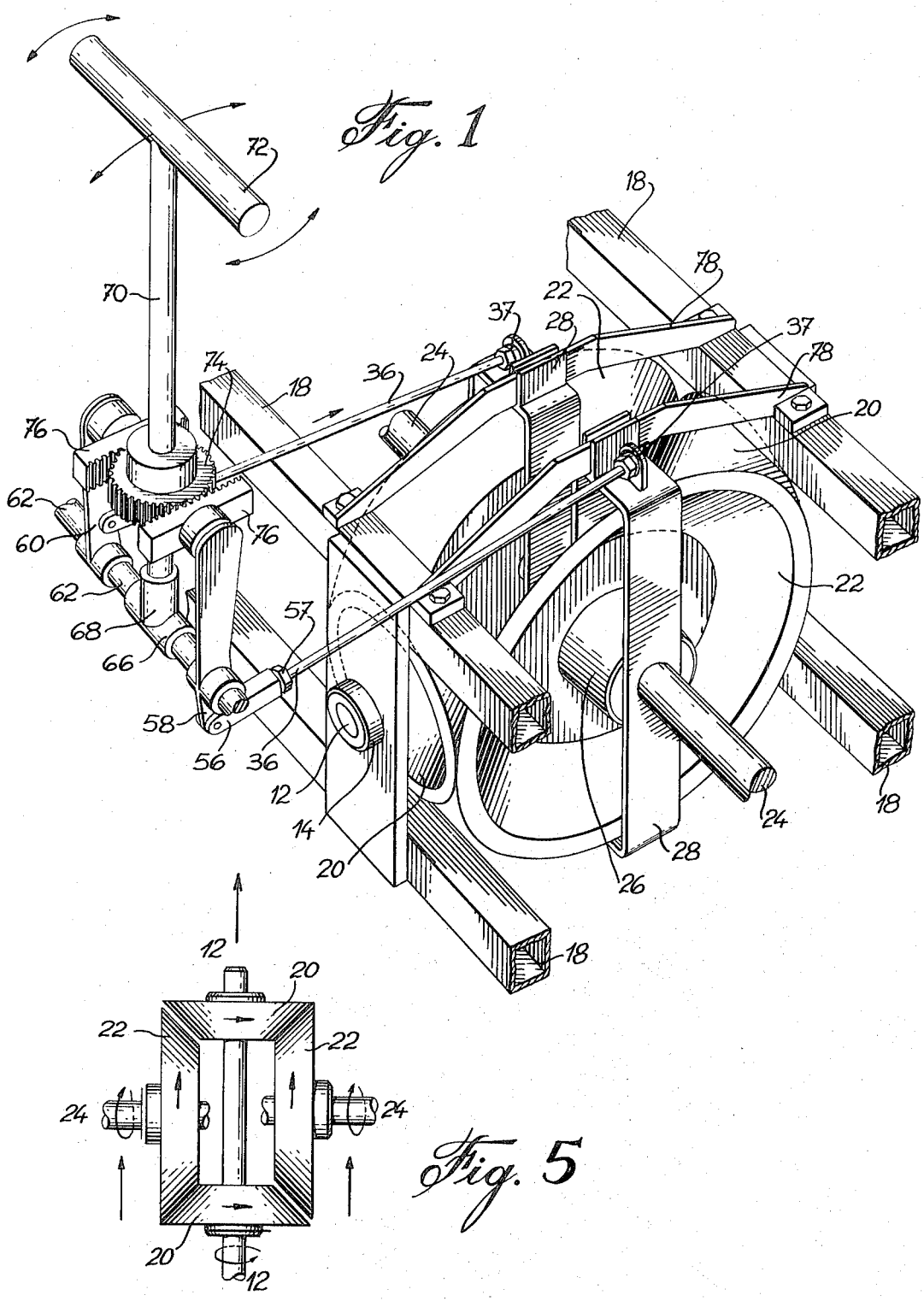

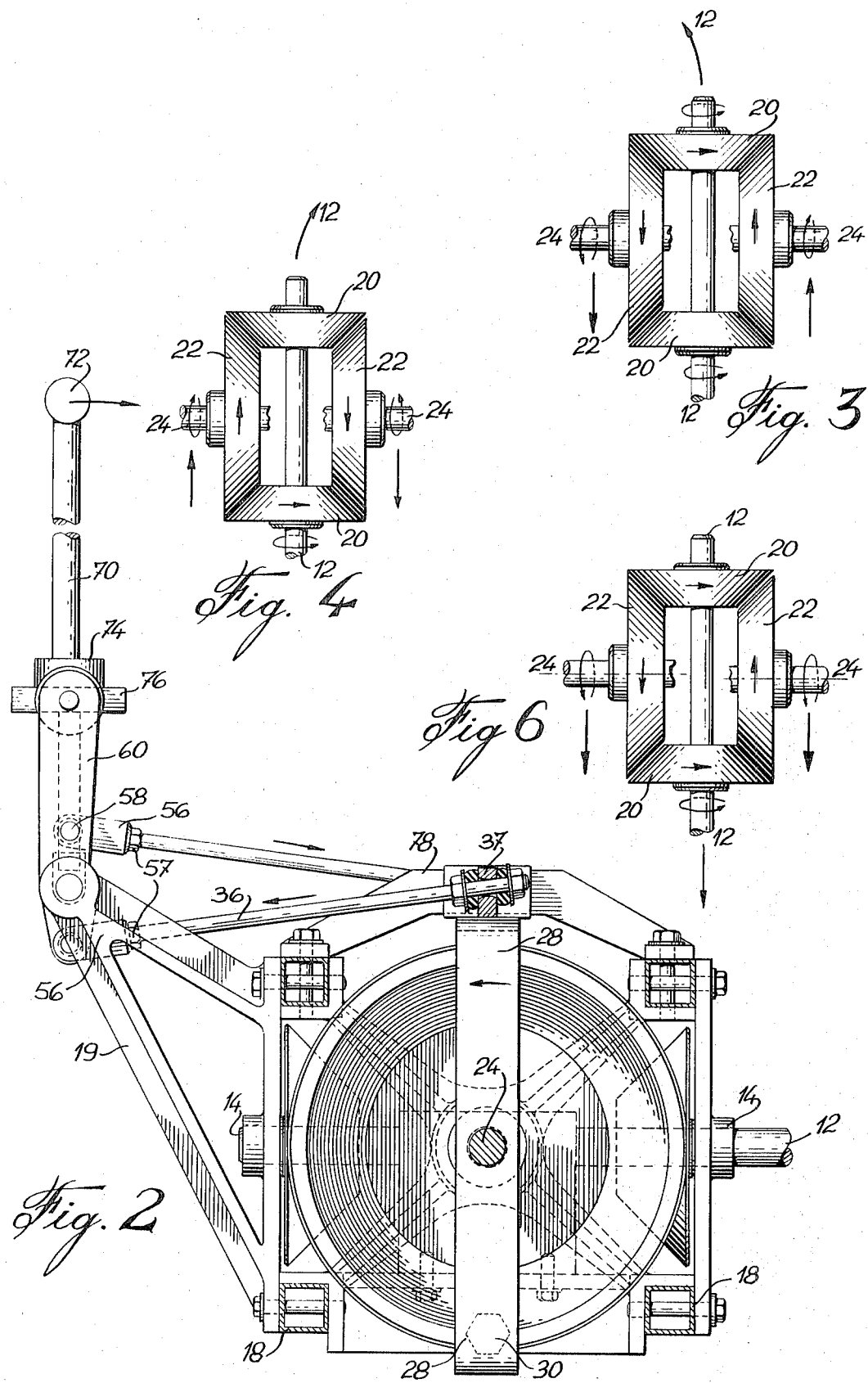

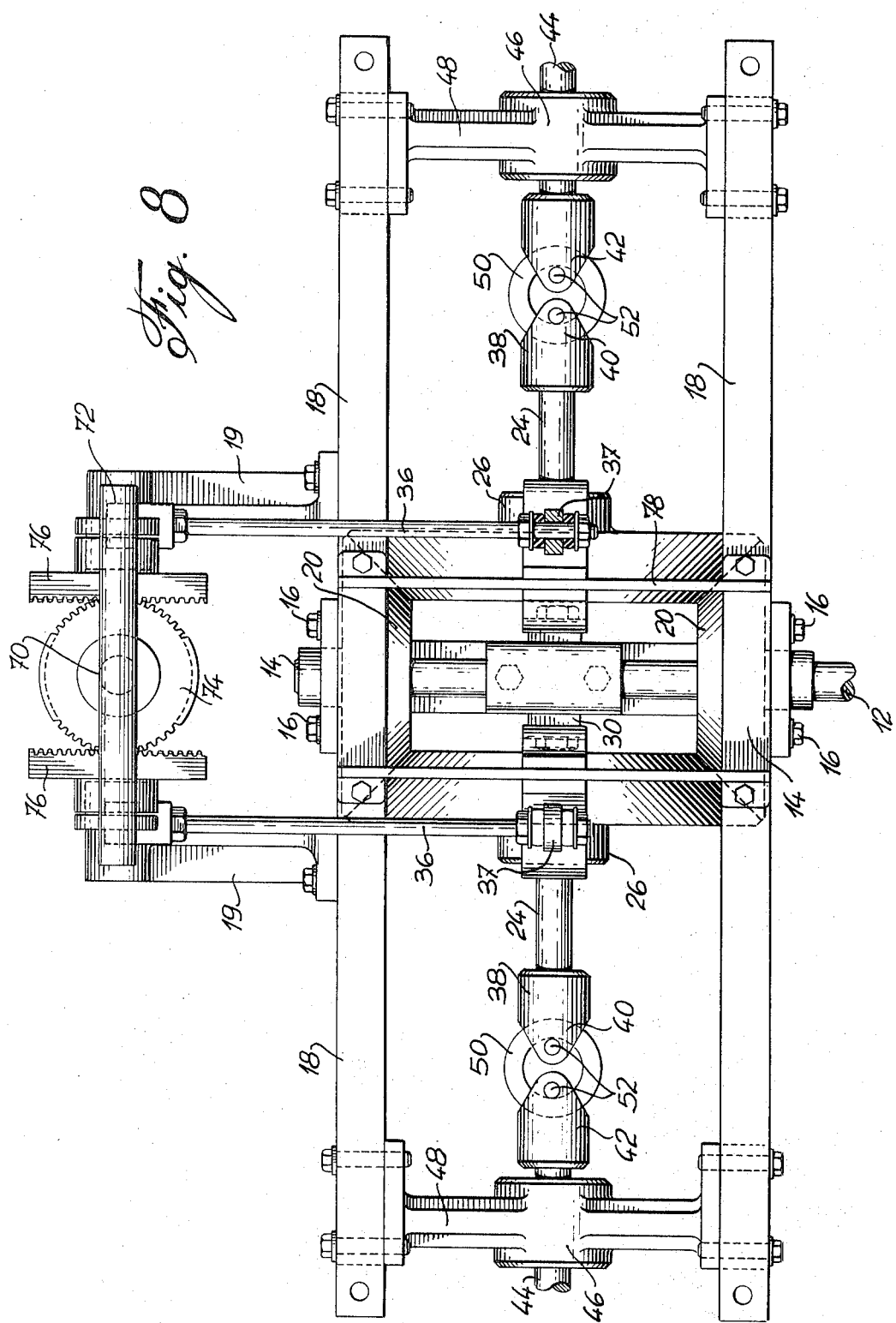

DRIVING AND STEERING UNIT

The present invention relates to a driving and steering unit for transmitting torque from a motor to opposite wheels of a vehicle.

The driving unit according to the present invention is meant primarily for small vehicles such as golf carts, loading trucks and the like and is particularly applicable to electric or steam driven vehicles which do not require variable torque transmission, although it can also be used in connection with vehicles powered by internal combustion engines where only low speeds are necessary. In addition the invention can be used in combination with a variable transmission if higher speed ratios are required.

The prior art provides a variety of mechanical elements which can be combined in many ways to provide the essential functions of frictional clutching, forward and reverse drive, steering in either direction and braking. It is the object of the present invention to provide all of the abovementioned functions by means of a very simple and reliable device having a minimum of moving parts.

The driving and steering unit according to the invention comprises a motor driven four-rolling-cones transmission, two of the cones (power cones) of smaller dimensions are mounted on the power shaft and made to contact alternately two driven cones (wheel cones) having connecting means with the wheels, mounting means for the wheel cones rototably on axes perpendicular to the axis of rotation of the driving shaft, carrier means slidably mounting the wheel cones for movement in a direction parallel to the axis of rotation of the driving shaft and actuating means for selectively moving the wheel cones into rolling contact with the driving or power cones.

It will be seen that, with this arrangement, a neutral position can be obtained by having the two driven cones out of contact with the power cones. If the driven cones are moved in opposite directions to engage respectively different power cones simultaneously a forward or reverse drive position is obtained, while if the driven cones are moved in the same direction to engage the same power cone simultaneously the wheels turn in opposite directions and the vehicle can be made to turn either to right or to the left. Shifting from forward to reverse or vice versa produces braking.

It is evident therefore that all the required functions mentioned above, namely forward, reverse, steering and braking can be obtained by the provision of the power cones and of the two driven cones, without any additional steering means or transmission gearing or the like. A further advantage of the invention is that due to the parallel tangential arrangement full clutching contact is obtained over a wide surface, making for secure power transmission, reduced wear, and for effective braking.

According to a further feature of the invention the connecting means between each driven cone and the corresponding wheel comprises an axle to which the cone is affixed, a journal for the axle, a shaft to which the wheel is affixed, a journal for the shaft secured to the vehicle, and a flexible joint connecting the shaft and axle.

Further according to the invention the flexible joint comprises slotted heads secured to the adjacent ends of the axle and shaft, a ring extending within the slotted heads and pins bridging the slotted heads and extending inside the ring.

It will be seen that this flexible joint provides the function of a double-universal joint which would be necessary to connect the parallel shifting shafts, and does so with extreme simplicity.

Further in accordance with the invention the actuating means for selectively moving the wheel cones into rolling contact with the power cones comprises an actuating rod pivoted on the vehicle, links connected to the wheel cones carrier means, and connecting means connecting the links to the rod on opposite sides of the pivotal axis thereof at equal distances from the pivotal axis.

Furthermore the rod has a handlebar at one end thereof and is mounted for rotation on its longitudinal axis and has a gear secured thereon, and the connecting means connecting the links to the rod comprise levers pivoted coaxially with the rod and racks mounted on the levers and meshing with the gear.

With this arrangement forward and reverse drives are obtained by shifting the lever preferably respectively upwardly and downwardly, while steering is obtained by turning the handlebar, preferably in the desired steering direction. Control of the functions by the operator is thus very natural and easy and makes for safe and effortless operation.

A preferred embodiment of the invention is illustrated by way of example in the accompanying drawings, in which FIG. 1 is a fragmentary perspective view showing the essential elements of the driving and steering unit according to the invention;

FIG. 2 is a fragmentary side elevation view of the same;

FIG. 3 is a fragmentary elevation showing the cones in position for a left turn;

FIG. 4 is a view similar to FIG. 3, showing the cones in position for a right turn;

FIG. 5 is a view, showing the cones in forward drive position;

FIG. 6 is a view showing the cones in reverse drive position;

FIG. 8 is a front elevation view of the unit; and

Figure 7:
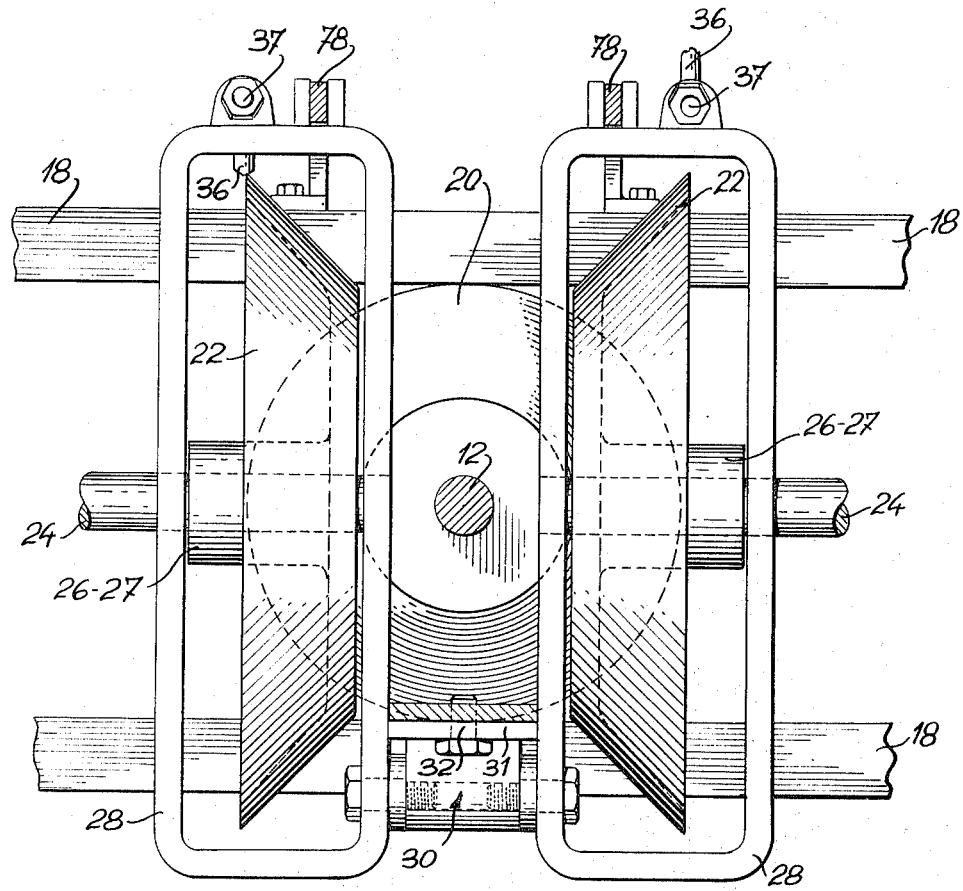
FIG. 7 is a side elevation view of the transmission.
Figure 9:
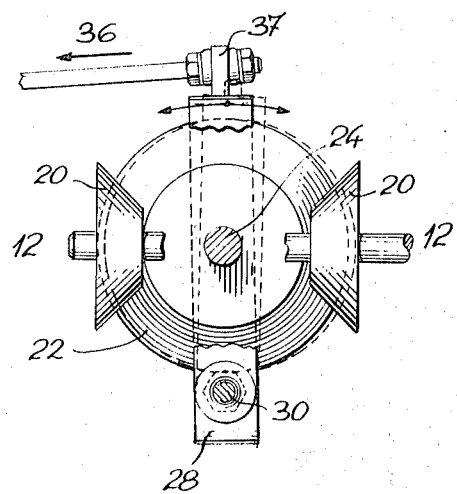
FIG. 9 is a fragmentary side elevation of the transmission showing control rods.

Referring to FIG. 8, power cones 20 are rigidly mounted on a shaft 12 which is journalled in bearings 14 fastened by screws 16 to a chassis 18 of the vehicle.

The surface of the power cones 20 is of frictional material, and they have a frusto-conical shape of equal but opposite inclination, mounted on the motor driven shaft 12.

Juxtaposed to the power cones on opposite sides thereof are a pair frusiro conical wheel cones 22 also of frictional material surfaces. The wheel cones 22 are fixed to axles 24 and have cone angles complementary to those of the power cones 20 so that their adjacent surfaces are parallel.

Each axle 24 is journalled in bearings 26 mounted in the housing 27 which is part of support 28 pivoted in bearing 30 rigidly secured by nuts 32 to a cross brace 31.

Each axle 24 has rigidly mounted on the outer end thereof a head 38, having a slot 40 (FIG. 8) extending inwardly from its outer end along an axial plane. A similar head 42 is mounted opposite each head 38 on a shaft 44 journalled in a bearing 46 secured by a crossframe 48 to the chassis 18 on either side of the vehicle. The opposed vehicle wheels (not shown) are mounted on the shafts 44.

Adjacent heads 38 and 42, on each side of the vehicle, are joined by a ring 50 which extends within the slotted heads. Each head 38, 42 has a pin 52 bridging the slot in the head near the outer extremity of the head and extending within the ring 50 whereby to constitute universal joints.

Each support 28 has a link 36 pivoted thereto by means of a screw and rubber washer and nut connection 37. Each link 36 has a yoke 56 at the other end adjustably mounted thereon and locked in position by a nut 57. Yokes 56 of links 36 are pivotally connected to two levers 58, 60 on a shaft 62 on which levers 58, 60 are pivotally mounted.

Shaft 62 is fixed with respect to the vehicle and also carries, between the pivotal connections of levers 58 and 60, a T-joint 64 the cross-arm 66 of which rotates on the shaft 62, while the stem 68 rotatably mounts a rod 70 having a handlebar 72 at its opposite end.

Rod 70 has secured thereon a gear 74, which meshes with a pair of racks 76, each mounted on the end of one of levers 58, 60.

Additionally each support 28 rests on the cross brace 31 bolted to the main frame 18 of the vehicle and pivots on the bearing 30 bolted to the supports by means of a bolts 32.

Motor or engine means, not shown, is connected to the shaft 12 by any suitable means such as a chain or a belt (not shown) to drive the cones 20.

In the neutral position, the supports 28 are in their central position and the axles 24 are alined with each other and with the center of cones 20. Driven cones 22 are thus out of contact with the cones 20 and no torque is transmitted to the wheels.

Forward drive is obtained by shifting the rod 72 to the left (see FIG. 1). Due to the mesh between the gear 74 and the racks 76, such movement causes pivoting of the levers 58, 60 in the same direction as rod 70 and travel of supports 28 in opposite directions. The cones 22 are thus shifted in opposite directions as shown in FIG. 5 and respectively engage the opposite cones 20, and are thereby rotated in the same forward direction. This rotation, which occurs gradually due to the frictional slip between the cones 22 and driving cones 20, is transmitted to the wheels (not shown) through the axles 24, the heads 38, the rings 50, the heads 42 and the shafts 44 on both sides. The heads 38 and 42 and the ring 50 constitute a flexible joint or in essence a double universal joint, which makes it possible to transmit torque to the wheels in spite of the shift in the axles 24.

Reverse drive is obtained by shifting the rod 70 to the right as shown (FIG. 1), whereby the exact opposite sequence of operations occurs. The position of the cones 22 with respect to the cones 20 in reverse position is shown in FIG. 6.

If it is desired to steer the vehicle the handlebar 72 is rotated in the desired turning direction. Consequent rotation of the rod 70 and the gear 74 produces movement of both the racks 76 and the levers 58, 60 in opposite directions whereby the supports 28 travel in the same direction so that the cones 22 both engage one of the cones 20 and are thereby rotated in opposite directions. The opposite rotation is communicated to the wheels, causing the vehicle to turn. The position of the cones 22 with respect to the cones 20 for left and right turns is indicated respectively in FIG. 3 and 4.

Adjustment to ensure that the cones 22 engage the cone 20 at the same time can be effected by adjusting the length of links 36 by means of the adjustable yokes 56.

It will be appreciated that steering is possible even while moving forward or in reverse. Turning of the handlebar 72 while the rod 70 in forward or reverse position causes one of the cones 22 to disengage from cones 20 with which it was in contact and to engage the opposite cone 20. The resulting braking effect on the wheel on that same side is sufficient to negotiate most curves. Minor adjustments of driving direction are effected by minor turning of the handlebar 72. The resulting slight variation in the engagement between the cones 22 and the cones 20 gives the desired directional regulation.

Shifting of the rod 72 from forward drive to reverse produces a positive braking effect and the vehicle can be brought to a stop in this fashion if care is taken to release the rod 72 into neutral before rearward movement begins. The vehicle can likewise be stopped when going in reverse, simply by shifting to forward and then to neutral before forward movement beings.

The pair of driven cones 22 along with bearings 26 and housings 27 are guide by the supports 28 sliding along guides 78 said guides being rigidly bolted to the frame 18.

We claim:

1. In a driving and steering unit having a drive shaft with spaced friction drive cones fixed thereon and a pair of driven cones selectively movable axially of said drive shaft into frictional driven contact with either of said drive cones, the improvement comprising:
   a pair of frames pivotally mounted, one on each side of said drive shaft, on a common axis displaced laterally from said drive shaft, said driven cones being journalled on said frames on axes normal to said drive shaft;
   a control rod mounted for swinging movement in a plane parallel to said drive shaft and for rotation about its own longitudinal axis; and
   connecting means between said control rod and each of said frames, responsive to swinging movement of said rod to swing said frames in respectively opposite directions about said common axis and responsive to rotation of said rod about its axis to simultaneously swing said frames in the same direction about said common axis.

2. A unit as defined in claim 1 wherein said unit includes fixed guide rails and wherein portions of said frames, remote from said common axis, slidably engage said guide rails.

3. A unit as defined in claim 1 wherein said control rod is swingable about a pivot axis transverse to said drive shaft, said connecting means comprising a pair of levers separately swingable about said axis on opposite sides of said control rod, a first link connecting one of said frames to one of said levers on one side of said pivot axis and a second link connecting the other frame to the other lever on the other side of said pivot axis, a gear rack on each of said levers, and a gear fixed on said control rod and meshing with both of said gear racks.

4. A unit as defined in claim 1 wherein said driven cones are fixed on axles which in turn are journalled in said frames, wheel shafts journalled on fixed axes generally aligned with said axles; and universal joint means drivingly connecting said axles to said wheel shafts, each universal joint comprising transversely slotted heads on said axles and wheel shafts, respectively, a ring member extending into both slotted heads, and pin means spanning said slots and extending through said ring.

* * * * *